(12) United States Patent
Lin

(10) Patent No.: US 8,146,617 B2
(45) Date of Patent: Apr. 3, 2012

(54) CHECK VALVE

(76) Inventor: Wen Yi Lin, Changhua (TW)

( * ) Notice: Subject to any disclaimer, the term of this patent is extended or adjusted under 35 U.S.C. 154(b) by 402 days.

(21) Appl. No.: 12/498,604

(22) Filed: Jul. 7, 2009

(65) Prior Publication Data

US 2011/0005618 A1    Jan. 13, 2011

(51) Int. Cl.
*F16K 17/00* (2006.01)
(52) U.S. Cl. ..................... 137/513.5; 137/540
(58) Field of Classification Search ............. 137/516.25, 137/516.27, 494, 601.2, 497, 504, 528, 535, 137/538, 540, 493.9, 513.5
See application file for complete search history.

(56) References Cited

U.S. PATENT DOCUMENTS

| 3,626,977 | A | * | 12/1971 | Riley et al. ............... 137/516.25 |
| 3,807,442 | A | * | 4/1974 | Sumner et al. ................ 137/498 |
| 3,872,884 | A | * | 3/1975 | Busdiecker et al. .......... 137/498 |
| 4,174,731 | A | * | 11/1979 | Sturgis et al. ................. 137/498 |
| 4,305,425 | A | * | 12/1981 | Mackal et al. ................ 137/541 |
| 5,465,751 | A | * | 11/1995 | Newton ........................ 137/498 |
| 7,111,638 | B2 | * | 9/2006 | Johnson ........................ 137/460 |
| 2001/0032675 | A1 | * | 10/2001 | Russell ....................... 137/493.9 |

* cited by examiner

*Primary Examiner* — Craig Schneider
*Assistant Examiner* — David Colon Morales
(74) *Attorney, Agent, or Firm* — Alan Kamarath; Kamrath IP Lawfirm, PA

(57) ABSTRACT

A check valve has a valve body, a piston and a spring. The valve body has a tube, a nozzle and a valve seal. The tube has a sealing protrusion and an inner surface. The sealing protrusion is formed around the inner surface of the tube. The nozzle is combined with the tube and has an insert hole and multiple outlets. The valve seal abuts a shoulder of the sealing protrusion. The piston is mounted in the valve body and has a shaft, a sealing ring and a plug. The shaft is mounted through the insert hole. The sealing ring is mounted in the sealing groove. The plug is a conic frustum and is mounted on a plug end of the shaft. The spring is mounted around the shaft. In operation, the check valve regulates outflow volume under varying pressure to prevent a waste of water.

10 Claims, 5 Drawing Sheets

CHECK VALVE

BACKGROUND OF THE INVENTION

1. Field of the Invention

The present invention relates to a check valve, and more particularly to a check valve that can decrease variation of an outflow with water pressure.

2. Description of Related Art

A conventional check valve can be used to allow fluids to flow in one predetermined direction but not in the other, and thus is often applied to a water supply system. The conventional check valve has an outlet that opens by water flow in the predetermined direction.

However, because a size of the outlet in the conventional check valve is not adjustable based on water pressure, water flow out from the check valve is increased substantially when water pressure increases so causing a waste of water.

To overcome the shortcomings, the present invention tends to provide a check valve to mitigate or obviate the aforementioned problems.

SUMMARY OF THE INVENTION

A check valve has a valve body, a piston and a spring. The valve body has a tube, a nozzle and a valve seal. The tube has a sealing protrusion and an inner surface. The sealing protrusion is formed around the inner surface of the tube. The nozzle is combined with the tube and has an insert hole and multiple outlets. The valve seal abuts against a shoulder of the sealing protrusion. The piston is mounted in the valve body and has a shaft, a sealing ring and a plug. The shaft is mounted through in the insert hole. The sealing ring is mounted in the sealing groove. The plug is a conic frustum and is mounted on a plug end of the shaft. The spring is mounted around the shaft. Therefore, the present invention can decrease variation of an outflow with water pressure and thus avoid a waste of water.

Other objects, advantages and novel features of the invention will become more apparent from the following detailed description when taken in conjunction with the accompanying drawings.

DETAILED DESCRIPTION OF PREFERRED EMBODIMENT

Figure 1:
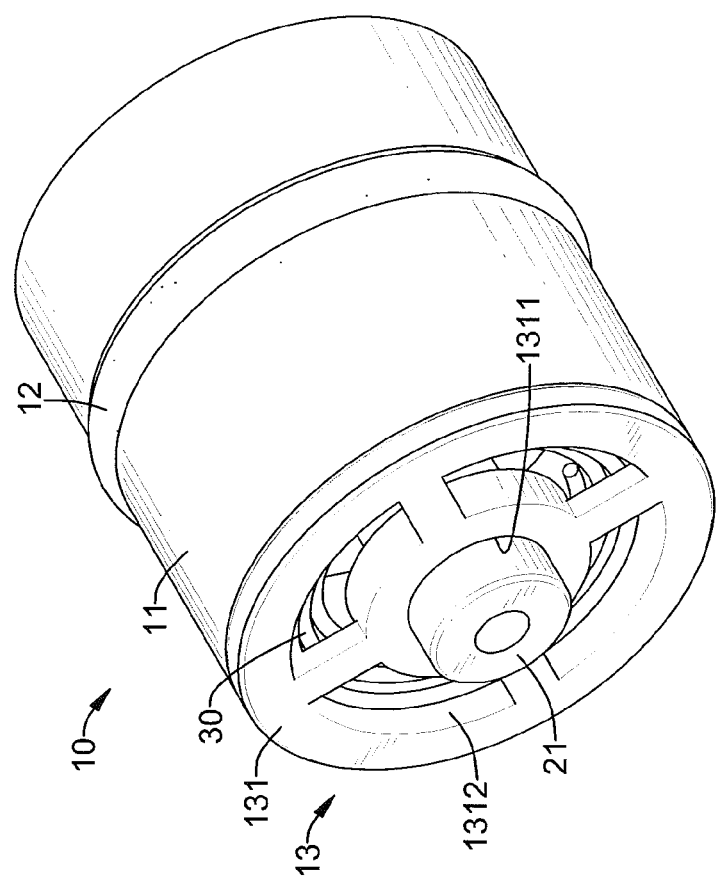
FIG. 1 is a perspective view of a check valve in accordance with the present invention.
Figure 2:
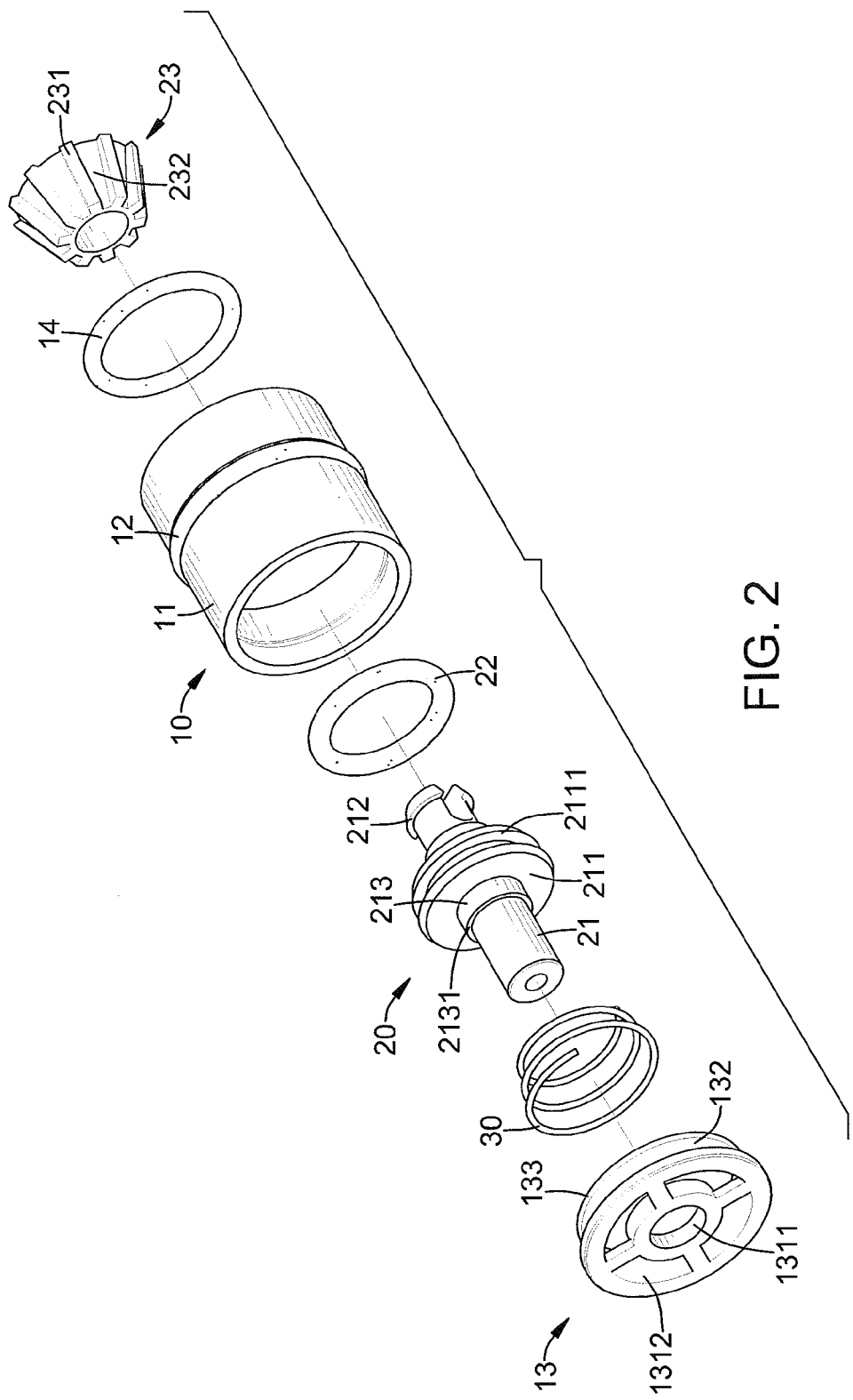
FIG. 2 is an exploded perspective view of the check valve in FIG. 1.
Figure 3:
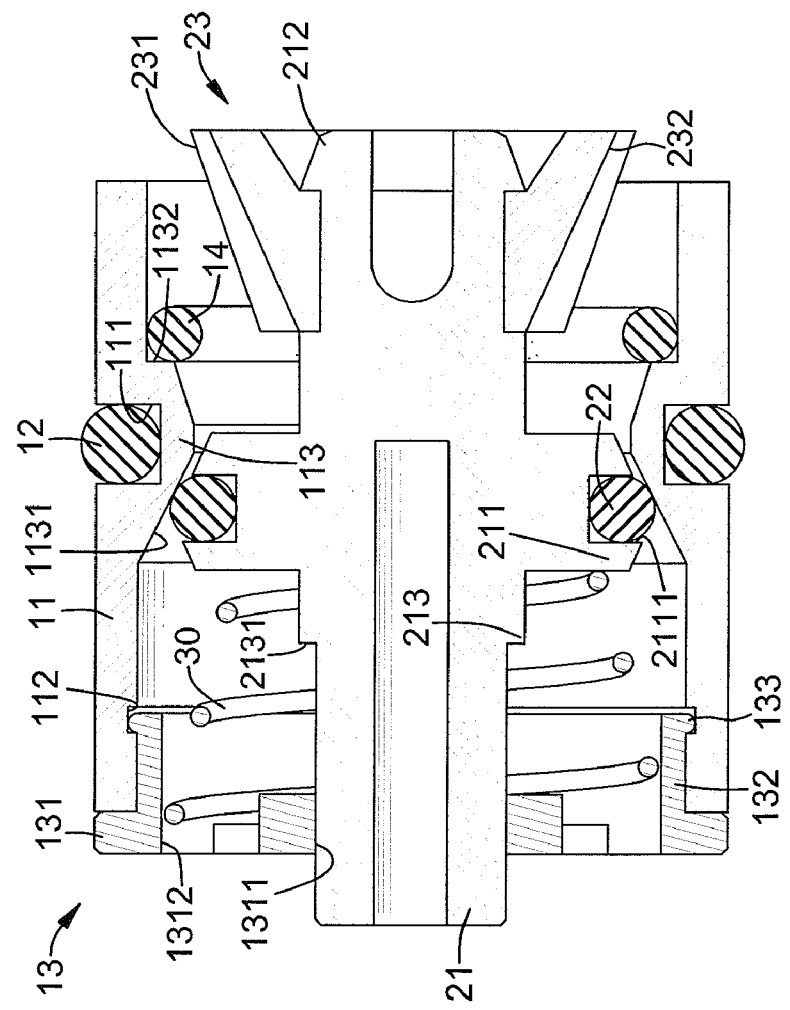
FIG. 3 is a cross sectional side view of the check valve in FIG. 1.

With reference to FIGS. 1 to 3, a check valve in accordance with the present invention comprises a valve body (10), a piston (20) and a spring (30). The valve body (10) comprises a tube (11), an O-ring (12), a nozzle (13) and a valve seal (14). The tube (11) is cylindrical and has an outer surface, an inner surface, a first end, a second end, a middle, an O-ring recess (111), a locking recess (112) and a sealing protrusion (113). The O-ring recess (111) is defined around the outer surface of the tube (11). The locking recess (112) is annular and is defined in the inner surface near the first end of the tube (11). The sealing protrusion (113) is formed annularly on and protrudes from the inner surface at the middle of the tube (11). The sealing protrusion (113) has an oblique end, an oblique surface (1131), an abutting end and a shoulder (1132). The oblique end faces the first end of the tube (11). The oblique surface (1131) is formed on the oblique end. The abutting end faces the second end of the tube (11). The shoulder (1132) is formed on the abutting end of the sealing protrusion (113) and is perpendicular to the inner surface of the tube (11). The O-ring (12) is mounted in the O-ring recess (111). The nozzle (13) is combined with and covers the first end of the tube (11) and has a cap (131), a connecting sleeve (132) and a flange (133). The cap (131) is attached to and abuts the first end of the tube (11) and has a center, an inner surface, an insert hole (1311) and multiple outlets (1312). The insert hole (1311) is defined through the center of the cap (131). Four outlets (1312) may be implemented, are defined through the cap (131) and are mounted around the insert hole (1311). The connecting sleeve (132) is formed on and protrudes from the cap (131) and abuts the inner surface of the tube (11). The flange (133) protrudes from the connecting sleeve (132) and is mounted in the locking recess (112) to securely connect the nozzle (13) to the first end of the tube (11). The valve seal (14) is annular, seals the shoulder (1132) against the inner surface of the tube (11) and has an internal diameter.

The piston (20) is mounted in the valve body (10) and comprises a shaft (21), a sealing ring (22) and a plug (23). The shaft (21) is mounted slidably through the insert hole (1311) and has a middle, a disk (211), an annular flange (212), a plug end and a step (213). The disk (211) is formed on and protrudes around the middle of the shaft (21) at a position corresponding to the insert hole (1311) of the cap (131) and has a connecting surface and a sealing groove (2111). The connecting surface faces the first end of the tube (11). The sealing groove (2111) is defined around the disk (211). The plug end is mounted in the second end of the tube (11). The annular flange (212) is formed around the plug end of the shaft (21). The step (213) is formed on the middle of the shaft (21), is connected with the connecting surface of the disk (211) and has a diameter larger than that of the shaft (21) to form a collar (2131) between the step (213) and the shaft (21). The sealing ring (22) is mounted in the sealing groove (2111) of the disk (211), and selectively abuts the oblique surface (1131) of the sealing protrusion (113) to close communication between two ends of the tube (11). The plug (23) may be formed on the plug end. In this embodiment, the plug (23) is a conic frustum, is mounted on the plug end of the shaft (21), abuts the annular flange (212) of the shaft (21) and comprises a first end, a second end, a peripheral surface (231) and multiple flutes (232). An outer diameter of the first end of the plug (23) is smaller than the internal diameter of the valve seal (14). The first end of the plug (23) is mounted in the valve seal (14). The second end of the plug (23) is opposite to the first end of the vale plug (23), is mounted around and engages the annular flange (212) of the shaft (21) and has an outer diameter. The outer diameter of the second end of the plug (23) is larger than the outer diameter of the first end of the plug (23). The peripheral surface (231) is formed around the plug (23). The flutes (232) are separately defined longitudinally in the peripheral surface (231).

The spring (30) may be a conical torsion spring, is mounted around the shaft (21) and has a proximal end and a distal end. The proximal end abuts against the inner surface of the cap (131). The distal end is opposite to the proximal and abuts against the connecting surface of the disk (211).

When water flows into the valve body (10) via the outlets (1312), the disk (211) will be pushed to move to make the O-ring (12) abut the oblique surface (1131). Consequently, water is unable to enter the valve body (10).

Figure 4:
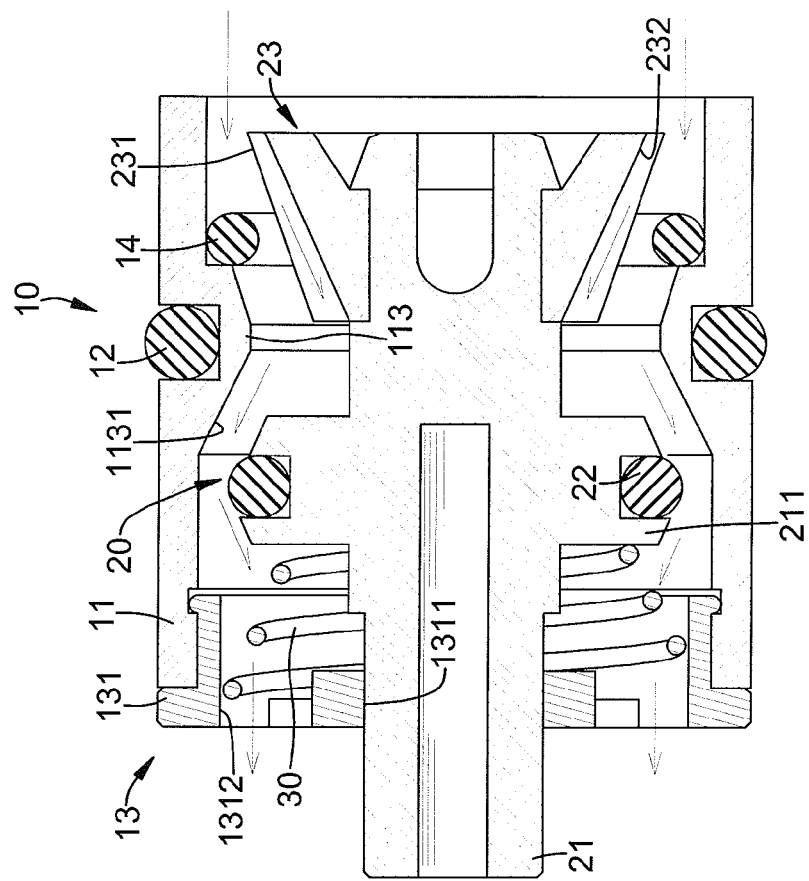
FIG. 4 is an operational cross sectional side view of the check valve in FIG. 1.

With reference to FIG. 4, when water flows into the body (10) from the second end of the valve body (10), water will push the disk (211) away from the sealing protrusion (113) to separate the O-ring (12) from the oblique surface (1131) and the spring (30) is compressed. Accordingly, communication between the ends of the tube (11) is enabled and water is allowed to flow out of the check valve via the outlets (1312).

Figure 5:
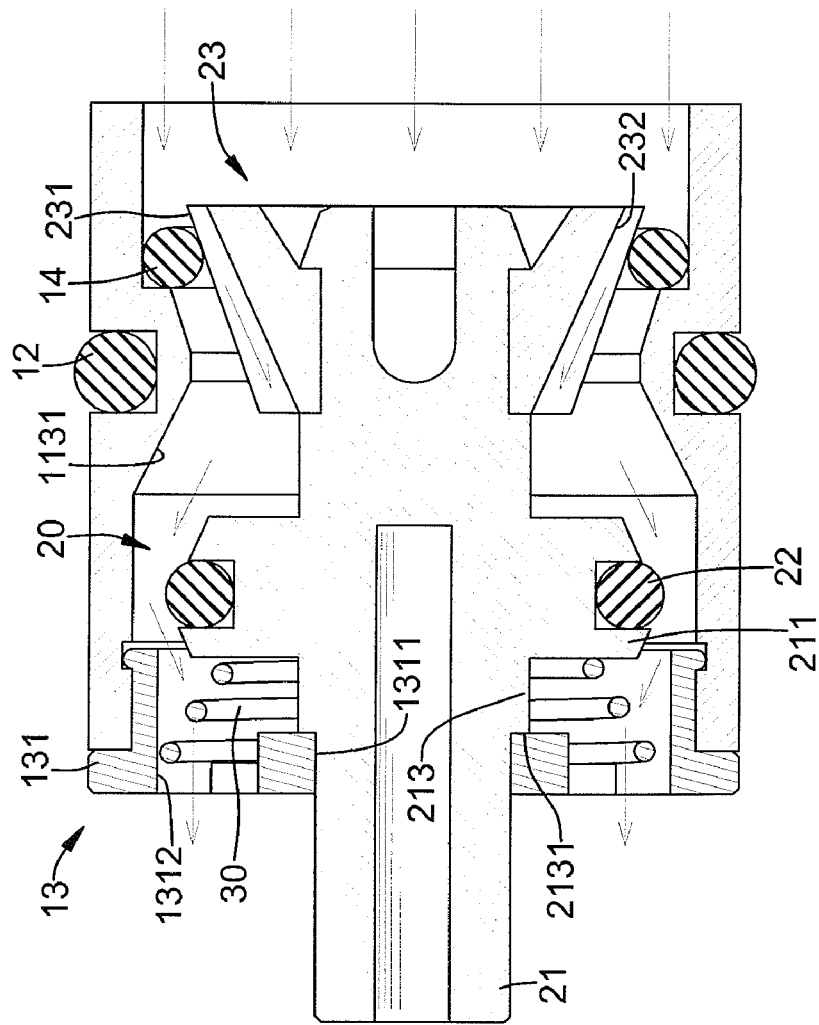
FIG. 5 is an operational cross sectional side view of the check valve in FIG. 1.

With reference to FIG. 5, when water pressure increases, the disk (211) will be pushed to move further to make the second end of the plug (23) approach the valve seal (14) and a gap between the valve seal (14) and the vale plug (23) is narrowed, so outflow is decreased. When the second end of the plug (23) abuts the valve seal (14), the gap is closed. Consequently, water is only allowed to flow through the flutes (232) such that the outflow of the check valve is efficiently decreased.

When tested, water pressure of an inflow was 40, 60, 80 and 100 psi and the outflow was respectively 1.4054, 1.5639, 1.6537 and 1.7752 U.S. gallons. Compared with a conventional check valve, the outflow of the conventional check valve was 1.7, 2.0, 2.3 and 2.6 U.S. gallons, respectively. Therefore, the check valve in accordance with the present invention can decrease variation of the outflow with water pressure and thus avoid a waste of water.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A check valve comprising:
   a valve body having
      a tube having
         a first end;
         a second end;
         an inner surface;
         a middle;
         a sealing protrusion formed annularly on and protruding from the inner surface at the middle of the tube and having;
            an oblique end facing the first end of the tube;
            an abutting end facing the second end of the tube;
            an oblique surface formed on the oblique end of the sealing protrusion; and
            a shoulder formed on the abutting end of the sealing protrusion;
      a nozzle combined with and covered on the first end of the tube and having
         a cap abutting the first end of the tube and having
            a center;
            an inner surface;
            an insert hole defined through the center of the cap;
            multiple outlets defined through the cap; and
         a valve seal abutting against the shoulder and the inner surface of the tube and having an internal diameter;
      a piston mounted in the valve body and having
         a shaft mounted slidably through the insert hole and having
            a disk protruding around the middle of the shaft and having
               a sealing groove defined around the disk;
            a plug end mounted in the second end of the tube;
         a sealing ring mounted in the sealing groove of the disk and selectively abutting the oblique surface of the sealing protrusion;
         a plug being a conic frustum, mounted on the plug end of the shaft and having
            a peripheral surface mounted around the plug;
            a first end of the plug having an outer diameter smaller than the internal diameter of the valve seal;
            a second end of the plug opposite to the first end of the vale plug and having an outer diameter larger than the outer diameter of the first end of the plug; and
         a spring mounted around the shaft and having
            a proximal end abutting against the inner surface of the cap;
            a distal end opposite to the proximal end.

2. The check valve as claimed in claim 1, wherein the shaft further has an annular flange formed around the plug end of the shaft, and the plug is mounted around and engages the annular flange of the shaft.

3. The check valve as claimed in claim 1, wherein the tube further has an annular locking recess defined in the inner surface of the tube, and the nozzle further has
   a connecting sleeve protruding from the cap and abutting the inner surface of the tube; and
   a flange protruding from the connecting sleeve and mounted in the locking recess.

4. The check valve as claimed in claim 3, wherein the shaft further has an annular flange formed around the plug end of the shaft, and the plug is mounted around and engages the annular flange of the shaft.

5. The check valve as claimed in claim 3, wherein the disk further has a connecting surface facing the first end of the tube; and the shaft further has a step formed on the middle of the shaft, connected with the connecting surface of the disk and having a diameter larger than that of the shaft to form a collar between the step and the shaft.

6. The check valve as claimed in claim 5, wherein the shaft further has an annular flange formed around the plug end of the shaft, and the plug is mounted around and engages the annular flange of the shaft.

7. The check valve as claimed in claim 5, wherein the shaft further has multiple flutes separately defined longitudinally in the peripheral surface.

8. The check valve as claimed in claim 7, wherein the shaft further has an annular flange formed around the plug end of the shaft, and the plug is mounted around and engages the annular flange of the shaft.

9. The check valve as claimed in claim 8, wherein the spring is a conical torsion spring, and the distal end of the spring abuts the connecting surface of the disk.

10. The check valve as claimed in claim 9, wherein the tube further has an O-ring recess defined around the outer surface of the tube, and the valve body further has an O-ring mounted in the O-ring recess.

* * * * *